United States Patent

[11] 3,548,087

[72] Inventor Satoshi Shimada
Tokyo, Japan
[21] Appl. No. 799,240
[22] Filed Feb. 14, 1969
[45] Patented Dec. 15, 1970
[73] Assignee Sony Corporation
Tokyo, Japan
a corporation of Japan
[32] Priority Feb. 14, 1968
[33] Japan
[31] No. 43/9333

[54] COLOR VIDEO SIGNAL GENERATING APPARATUS
5 Claims, 10 Drawing Figs.

[52] U.S. Cl. 178/5.4
[51] Int. Cl. H04n 9/04
[50] Field of Search 178/5.2, 5.4, 5.4STC

[56] References Cited
UNITED STATES PATENTS
2,865,985 12/1958 Borkan et al. 178/5.4(STC)
3,502,799 3/1970 Watanabe 178/5.4(STC)

*Primary Examiner*—Richard Murray
*Attorneys*—Lewis H. Elsinger and Curtis, Morris & Safford ABSTRACT: A color video signal-generating apparatus having an image pickup tube onto which is projected a striped color separated image. Narrow band primary color signals derived from the image pickup tube are caused to depend on wide band composite signals to compensate for the partial defocusing of the reproduced picture.

INVENTOR.
SATOSHI SHIMADA
Lewis H. Eslinger
ATTORNEY

Fig. 5
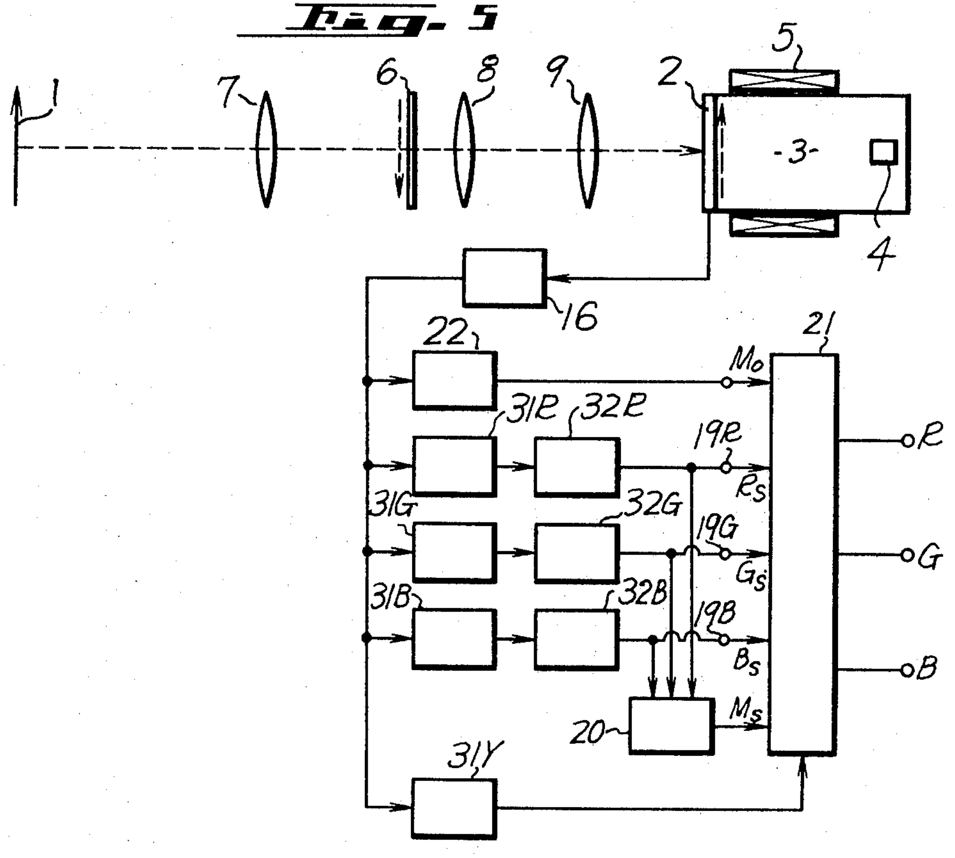
Fig. 6A Fig. 6B Fig. 6C
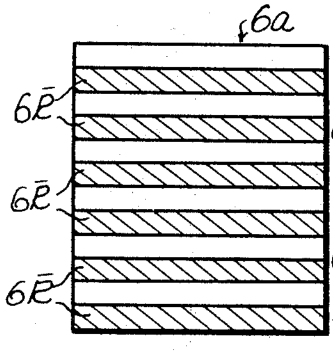
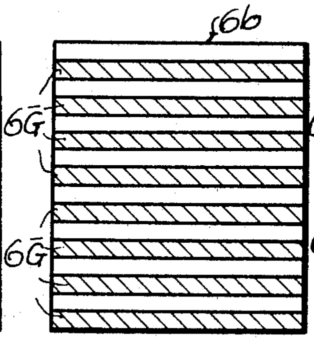
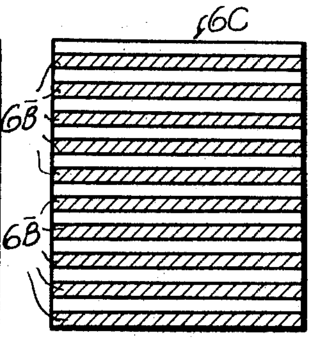

COLOR VIDEO SIGNAL GENERATING APPARATUS

It is desirable to have a color video signal-generating apparatus which produces color signals of high resolution. There have been proposed various color video signal-generating apparatus of the type which utilizes one or two image pickup tubes. These apparatuses have proved to be inefficient because the resulting color component signals are narrow band and therefore are of low resolution. This, of course, introduces partial defocussing of the reproduced picture.

In accordance with the present invention narrow band primary color signals derived from an image pickup tube are caused to depend on wide band composite signals related to the primary color signals to compensate for the partial defocussing of the reproduced picture. The color video signal-generating apparatus of the invention comprises an image pickup tube which can be a known vidicon tube. A color filter element comprising a plurality of strips of color filter elements of different wavelength band characteristics onto which the real image of the object to be televised is projected. A striped color separated image of the object to be televised is projected onto the pickup tube. A circuit is provided for deriving a plurality of primary color signals from the pickup tube and a circuit for combining together more than two signals of the plurality of primary color signals to produce a composite primary color signal. A circuit is provided for deriving a low frequency component from the image pickup tube and another circuit for forming a signal corresponding to the ratio of the composite primary color signal to the low frequency component. Finally a circuit is provided for producing the product of the ratio signal and each of the primary color signals.

Thus, it is an object of this invention to provide a color video signal-generating apparatus capable of producing wide band color video signals.

Another object of this invention is to provide a color video signal-generating apparatus which is simple in construction but is capable of producing color video signals with high resolution.

An additional object of this invention is to provide a color video signal-generating apparatus which insures uniformity of the reproduced picture over its entire area.

Other objects, features and advantages of this invention will become apparent from the following description taken in conjunction with the accompanying drawings, in which:

FIG. 5 is a system diagram showing a third embodiment of the invention;

Figure 8:
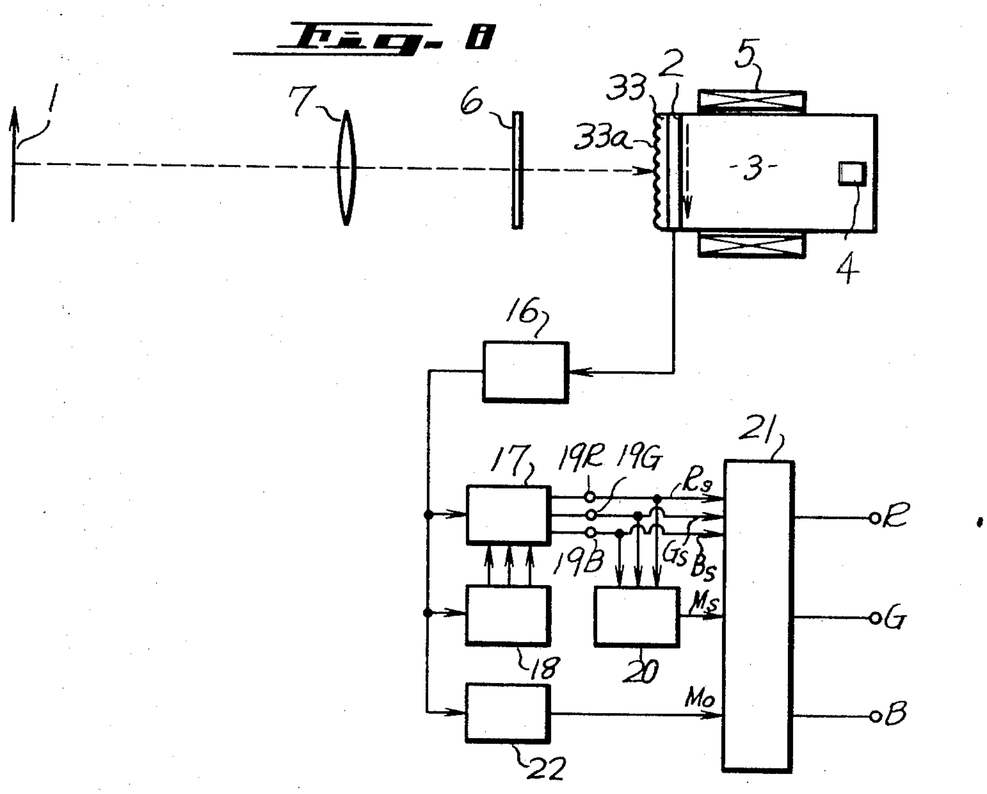
Figure 7:
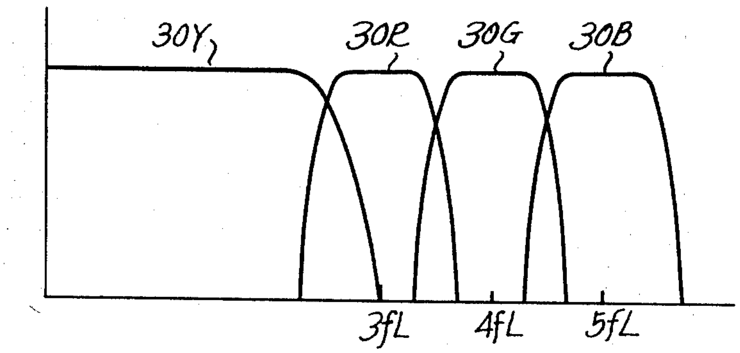

FIGS. 6*a*—6*c* shows a striped color filter used in the FIG. 5 embodiment;

FIG. 7 shows frequency characteristic curves of signals obtained from the color image pickup tube; and FIG. 8 is a system diagram showing a fourth embodiment of the invention.

Figure 1:
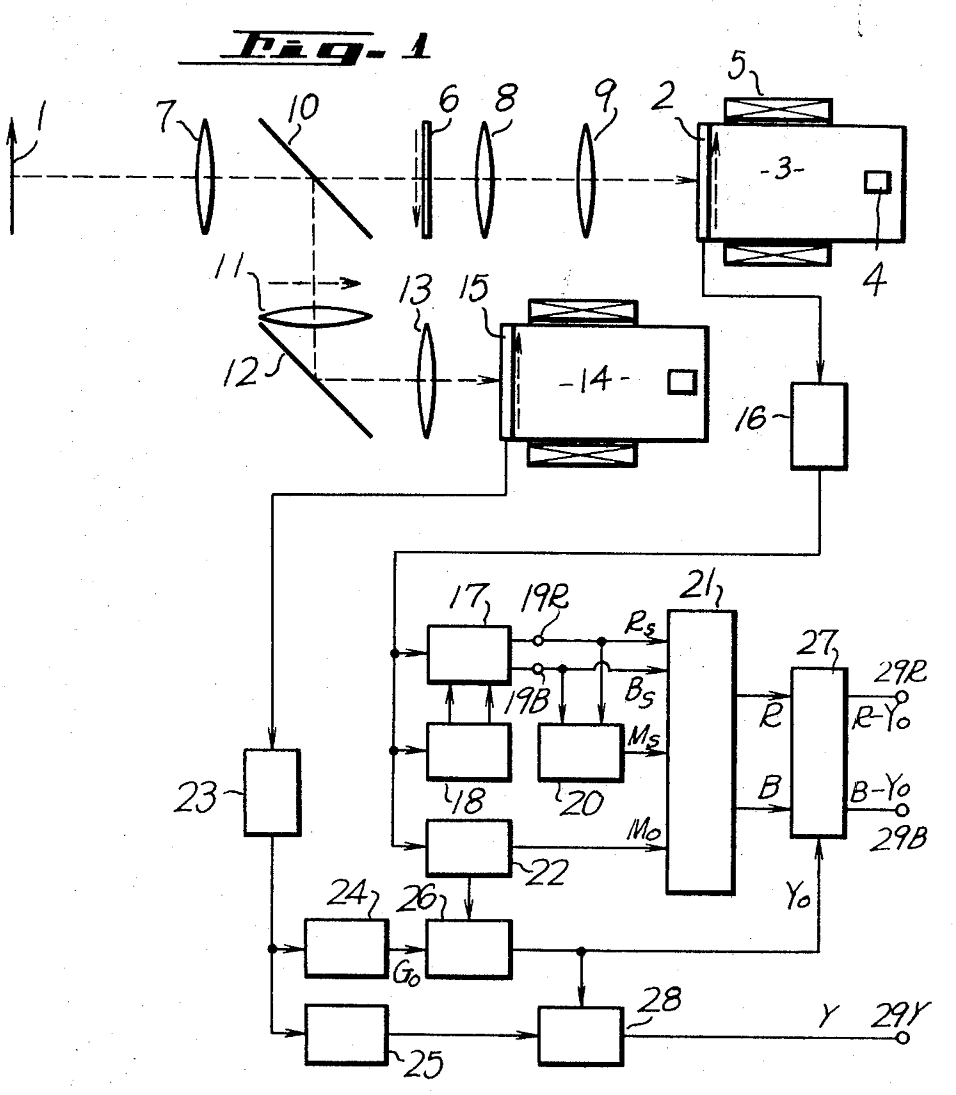
FIG. 1 is a system diagram showing one embodiment of the invention.
Figure 2:
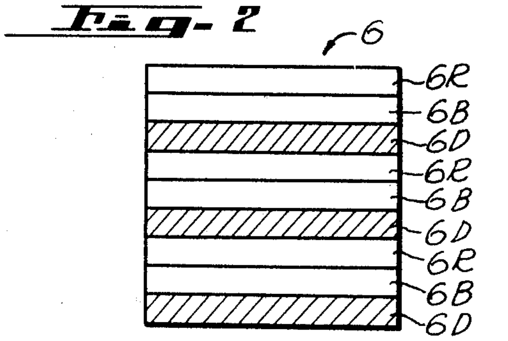
FIG. 2 is a plan view of a striped color filter used in the apparatus of FIG. 1.

Referring to FIG. 1 there is shown an object 1 to be televised. The image of the object 1 is projected onto the photoconductive layer 2 of a pickup tube 3 such as a vidicon tube. The vidicon tube 3 comprises an electron gun 4 located adjacent the end of an envelope remote from the photoconductive layer 2 and an electron beam deflection means 5 mounted on the outside of the envelope. In the optical path, shown by the dashed lines, between the photoconductive layer 2 and the object 1 there is disposed a filter 6 having bands or stripes of color thereon. The color-filter elements have different wavelength band characteristics.

A real image of the object 1 is formed by a camera lens 7 on the striped color filter 6 and is then projected onto the photoconductive layer 2 by a field lens 8 and a relay lens 9. The color filter 6 consists of a strip red color-filter element 6R permitting primarily the passage of red color light therethrough, a strip blue color-filter element 6B permitting primarily the passage of blue color light therethrough and a strip index-forming element 6D inhibiting the passage of all color light therethrough, the elements being sequentially arranged in a repeating cyclic order. The real image of the object 1 formed on such a color filter 6 is projected onto the photoconductive layer 2 together with an image of the color filter 6, thereby forming a striped color-separated image of the object 1 on the photoconductive layer 2. Further, the illustrated apparatus employs two image pickup tubes, in which a dichroic mirror 10 in this case, or a half-silvered mirror or the like is disposed in an optical path between the object 1 and the striped color filter 6. The dichroic mirror 10 permits the passage of magenta color light, that is, red and blue color light only therethrough and directs it to the color filter 6, while a real image of the object 1 is formed in front of a field lens 11 by green color light reflected by the dichroic mirror 10 and the real image is projected by a mirror 12 and a relay lens 13 onto the photoconductive layer 15 of an image pickup tube 14 for a luminance signal.

Consequently, color signals can be produced by scanning the photoconductive layer 2 of the vidicon tube 3 with an electron beam in such a manner that its horizontal scanning direction may cross the stripes of the striped color-separated image. The resulting color signals are applied to a sampling circuit 17 after being amplified by an amplifier 16, while one portion of the color signal is fed to an index signal-separating circuit 18. The circuit 18 produces an index signal having repeating frequencies and phases corresponding to the images of the index-forming elements 6D formed on the photoconductive layer 2 of the vidicon tube 3 to produce sampling signals suitably ore in phase from the index signals. With the sampling signals, signals corresponding to the images of the red color-filter elements 6R and the blue color-filter elements 6B are sampled out in the sampling circuit 17, thus deriving narrow-band red and blue color signals $R_s$ and $B_s$ from output terminals 19R and 19B of the sampling circuit 17.

In the present invention at least two narrow-band primary color signals derived from the color signals based on the striped color-separated image are combined together to provide a composite primary-color signal, and then a signal is produced which is representative of the ratio of the composite primary-color signal to an average composite signal of the color signals obtained by applying the signals from the vidicon tube 3 to a low-pass filter 22. The primary color signals are respectively multiplied by the resulting signal to be rendered dependent upon the average composite signal so as to compensate for partial defocussing on the photoconductive layer. In the embodiment of FIG. 1 one portion of each of the primary color signals derived from the color signal carrier components, in other words, the red and blue signals $R_s$ and $B_s$ derived from the terminals 19R and 19B of the sampling circuit 17 is applied to a mixer circuit 20 to combine the primary color signals together to provide a composite signal $M_s = R_s + B_s$, which is fed to a compensating circuit 21. While, one portion of the color signal from the amplifier 16 is applied to the low-pass filter 22 having a cutoff frequency lower than the carrier component of the color signal to produce an average component signal $M_o = R_o + B_o$, which is fed to the compensating circuit 21. The compensating circuit 21 is supplied with the primary color signals $R_s$ and $B_s$ from the terminals 19R and 19B and achieves the following operations:

$$R_s \times \frac{M_o}{M_s} \text{ and } B_s \times \frac{M_o}{M_s}$$

Aproducing corrected red and blue signals R and B. The apparatus exemplified in the figure has been adapted to produce color difference signals, so that the output of the image pickup tube 14 for generating a luminance signal is applied through an amplifier 23 to a low-pass filter 24 and a high pass filter 25. The low-pass filter 24 has substantially the same frequency characteristic as the low-pass filter 22 and the output of the filter 24 is applied to an adder circuit 26 in which a low frequency green color signal $G_o$ and the average composite signal $M_o$ derived from the low-pass filter 22 are added together to produce a low frequency luminance signal $Y_o$, which is applied to a matrix circuit 27. Meanwhile, the output of the high pass filter 25 is applied to an adder 28, which is supplied with the low frequency luminance signal $Y_o$ to produce a luminance signal Y from an output terminal 29Y of the adder 28. Further, the aforementioned corrected red and blue signals R and B are applied to the matrix circuit 27, from the output terminals 29R and 29B of which color difference signals R–Y and B–Y are derived.

Figure 3:
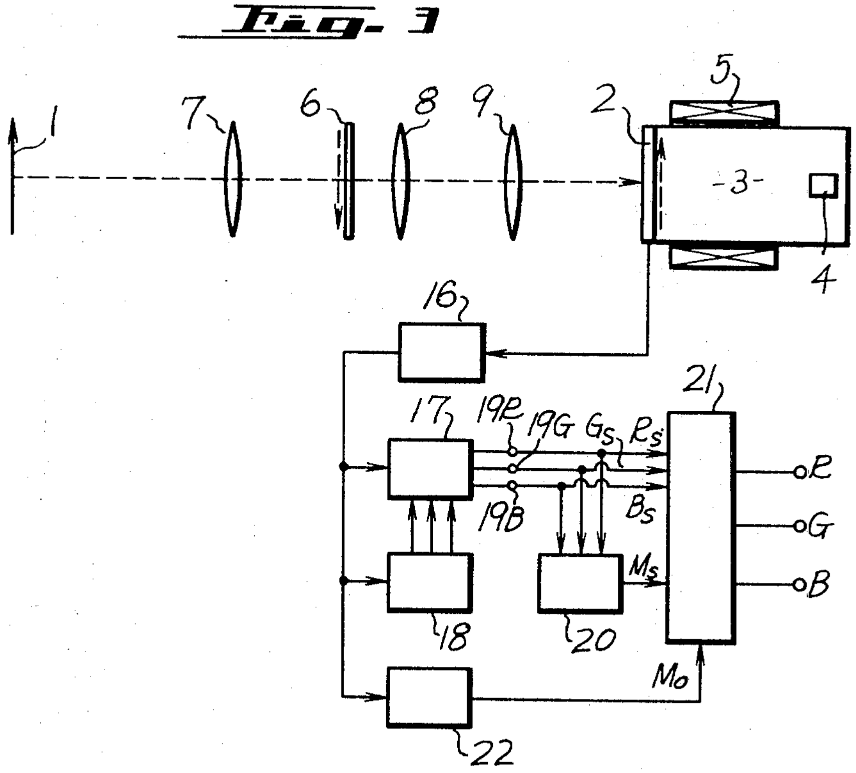
FIG. 3 is a system diagram showing a second embodiment of this invention.
Figure 4:
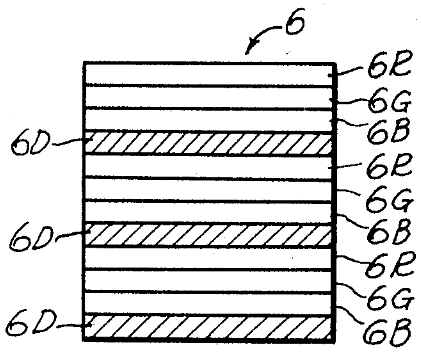
FIG. 4 is a plan view of a striped color filter used in the apparatus of FIG. 3.

Although the present invention has been described with the apparatus employing two image pickup tubes, the invention need not be limited specifically thereto and permits of such an arrangement as depicted in FIG. 3. In the figure similar elements to those in FIG. 1 are indicated by similar reference numerals and no further description need be given. The present example employs a color filter 6 such as shown in FIG. 4, which consists of strip red color-filter elements 6R permitting primarily the passage of red color light, strip green color-filter elements 6G permitting primarily the passage of green color light, strip blue color-filter elements 6B and index signal generating elements 6D, the elements being sequentially arranged in a repeating cyclic order. In such a case red, green and blue primary color signals $R_s$, $G_s$, and $B_s$ are derived from output terminals 19R, 19G and 19B of a sampling circuit 17 by sampling signals of suitable phases produced by an index signal separating circuit 18. The resulting primary color signals are applied to a compensating circuit 21 and a mixer circuit 20 and a composite signal $R_s + R_G + R_B = M_s$ of the primary color signals is produced in the mixer circuit 20. From a low-pass filter 22 an average composite signals $R_o + G_o + B_o = M_o$ is derived and is applied to the compensating circuit 21, in which the primary color signals are respectively multiplied by a signal corresponding to the ratio of the average composite signal $M_o$ to the composite primary color signal $M_s$, thereby producing compensated signals R, G and B.

Further, in the foregoing the color signals are separated by displacing the color signal carriers in phase in accordance with the color components but this may be achieved by synchronous detection. In addition, the separation of the color signals may also be effected by selecting the color signal carriers at different frequencies, as exemplified in FIG. 5. The apparatus shown in the FIG. employs a striped or banded color filter 6 which comprises striped color-filter members **6*a*, 6*b* and 6*c* such as shown in FIG. 6 for producing red, green and blue color signals respectively. The color-filter member 6*a* consists of a plurality of strip cyan color-filter elements 6R arranged at regular intervals, the color-filter member 6*b* consists of strip magenta color-filter elements 6G arranged at regular intervals and the color-filter member 6*c* consists of strip yellow color-filter elements 6B arranged at regular intervals as clearly shown in the figure, the striped color-filter members being arranged in parallel and overlapping relationship. In this case, if the widths of the cyan, magenta- and yellow-filter elements 6R, 6G and 6B are selected such that the filter elements are respectively six, eight and ten in number and if the carrier of the red color signal component 30R is $3f_L$ as shown in FIG. 7, the carriers of green and blue signal components 30G and 30B are respectively $4f_L$ and $5f_L$. Accordingly, the color signal from an amplifier 16 is applied to a low-pass filter 31Y for a luminance signal 30Y, a low-pass filter 22 similar to the aforementioned one and band-pass filter 31R, 31G and 31B respectively for red, green and blue color signals, by which the center frequencies of the pass bands of the filters 31R, 31G and 31B are respectively rendered to be $3f_L$, $4f_L$ and $5f_L$. The outputs of the band-pass filters 31R, 31G and 31B are respectively applied to detector circuits 32R, 32G and 32B, at the output terminals 19R, 19G and 19B of which are thereby produced primary color signals $R_s$, $G_s$ and $B_s$ obtained from carrier signals of color signals, and the resulting primary color signals are fed to a compensating circuit 21 and a mixer circuit 20. Meanwhile, the output of the low-pass filter 31Y is applied to the mixer circuit 21. An average composite signal $M_o = Y_o + G_o + B_o$ is derived from the low-pass filter 22 and a composite primary color signal $M_s = M_s + G_s + B_s$ is derived from the mixer circuit 20, and these signals $M_o$ and $M_s$ are fed to the compensating circuit 21**.

Although the striped color-separated image is produced by forming the real image of the object 1 at the position of the banded color filter, it may be obtained with such an arrangement as depicted in FIG. 8. The real image of an object 1 is formed by a camera lens 7 on a photoconductive layer 2 of an image pickup tube 3 and an image of a banded color filter 6 is formed on the photoconductive layer 2 by each of cylindrical lens **33*a* making up a lens screen 33 to thereby form continuous images of the banded color filter 6**.

The color filter 6 is that shown in FIG. 4 and other similar elements to those in FIG. 4 are identified by similar reference numerals and no further description is deemed necessary.

With the color video signal-generating apparatus of this invention, even if the image on the photoconductive layer 2 gets partially defocussed to cause a partial decrease in the levels of the primary color signals obtained from the carrier signal components of the color signals, the decrease is compensated for, as has been described in the foregoing. Namely, if the primary color signals obtained from, for example, the carrier components, that is, the signals $R_s$ and $B_s$ derived from the terminals 19R and 19B in FIG. 1 are represented in the forms of the DC component $R_o$ of the red color signal and that $B_o$ of the blue color signal, $R_s = k{}R_o$ and $B_s = k{}B_o$, $k{}1$, and $k$ varies with the defocussing of the image on the photoconductive layer 2. Consequently, in the case of the red color signal $R_s$, compensation such as $R_s \cdot \frac{M_o}{M_s}$ is effected in the compensating circuit 21** and if the above equations are substituted into this, $kR_o \times \frac{R_o + B_o}{kR_o + kB_o} R_o$ and $R_o$ remains constant regardless of the value of $k$. In addition, excellent signals which do not cause defocussing of the image can be obtained. The same may be said of the other examples.

While there has been shown and described a particular embodiment of this invention, it will be obvious to those skilled in the art that various changes and modifications can be made therein without departing from the invention, and therefore, it is intended in the appended claims to cover all such changes and modifications as fall within the true spirit and scope of the invention.

I claim:

1. A color video signal-generating apparatus comprising an image pickup tube, a color filter comprising a plurality of color-filter elements, means for projecting onto the image pickup tube a color-separated image of an object to be televised, a circuit for deriving a plurality of primary color signals from the pickup tube and a circuit for combining more than two signals of the plurality of primary color signals to produce a composite primary color signal, a circuit for deriving a low frequency component from the image pickup tube, a circuit for forming a signal corresponding to the ratio of the composite primary color signal to the low frequency component, and a circuit for producing the product of the ratio signal and each of the primary color signals.

2. A color video signal-generating apparatus as defined in claim 1 wherein the projecting means includes a lens screen consisting of a plurality of lenses.

3. A color video signal-generating apparatus as defined in claim 1 which includes a second image pickup tube for producing a luminance signal of the object.

4. A color video signal-generating apparatus as defined in claim 3 which includes a circuit for combining the output of the second image pickup tube and the low frequency component.

5. A color video signal-generating apparatus as defined in claim 4 which includes a circuit for deriving color difference signals from the output of the circuit for producing the product of the ratio signal and each of the primary color signals.